United States Patent
Stanford

(10) Patent No.: US 7,161,933 B2
(45) Date of Patent: Jan. 9, 2007

(54) OPTIMISTIC CACHING FOR ADDRESS TRANSLATIONS

(75) Inventor: Michael Stanford, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 10/254,484

(22) Filed: Sep. 24, 2002

(65) Prior Publication Data

US 2004/0057419 A1 Mar. 25, 2004

(51) Int. Cl.
  *H04L 12/28* (2006.01)
  *H04L 12/66* (2006.01)
  *H04L 12/56* (2006.01)

(52) U.S. Cl. .................. 370/352; 370/400; 370/431

(58) Field of Classification Search ............... 370/431, 370/352, 400
See application file for complete search history.

(56) References Cited

U.S. PATENT DOCUMENTS

| | | | |
|---|---|---|---|
| 2002/0027915 A1* | 3/2002 | Foti et al. | 370/392 |
| 2002/0042825 A1 | 4/2002 | Gee | 709/227 |
| 2002/0114324 A1 | 8/2002 | Low et al. | 370/352 |
| 2002/0129236 A1* | 9/2002 | Nuutinen | 713/151 |
| 2003/0039241 A1* | 2/2003 | Park et al. | 370/352 |
| 2003/0074461 A1* | 4/2003 | Kang et al. | 709/230 |
| 2003/0216140 A1* | 11/2003 | Chambert | 455/426.1 |

FOREIGN PATENT DOCUMENTS

| EP | 1 207 703 A2 | 5/2002 |
|---|---|---|
| WO | WO 02/30094 A2 | 4/2002 |

OTHER PUBLICATIONS

R. Stastny, "ENUM—Phone Numbers on the Internet—Telefonnummem im Internet," Elektrotechnik und Informationstechnik, vol. 119, No. 4, Apr. 2002, pp. 126-135, XP:009009281, Springer Verlag, Wien.

* cited by examiner

Primary Examiner—Kevin C. Harper
(74) Attorney, Agent, or Firm—Kacvinsky LLC

(57) ABSTRACT

A method and apparatus to manage a call connection is described.

20 Claims, 3 Drawing Sheets

OPTIMISTIC CACHING FOR ADDRESS TRANSLATIONS

BACKGROUND

Telephony communications is starting to migrate from traditional circuit-switched networks to packet networks, such as a Voice Over Packet (VOP) network. Setting up a call connection over a packet network, however, may be slower than conventional circuit-switched networks. Therefore, there may be a need for techniques to decrease call connection set up time for packet networks, such as VOP networks.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage a call connection over a VOP network. In one embodiment, a call terminal may be configured with a Call Management Module (CMM). The CMM may assist in setting up a call connection with another call terminal. For a packet telephony call, a telephone number is typically translated into a network address to complete the call connection. This translation process may delay call setup. To reduce this delay, a call terminal may use a cache to retrieve a network address corresponding to a particular telephone number. As with conventional cache technology, however, the contents of a cache may become out of date. The embodiments attempt to use the advantages provided by cache technology, while reducing some of its disadvantages.

In one embodiment of the invention, a call terminal may receive a telephone number for initiating a call connection. The CMM may use a cache to retrieve a network address corresponding to the telephone number. The CMM may use the network address to initiate a call connection. During call setup, the CMM may then initiate a validation process to ensure that the network address is valid. If the CMM confirms that the network address remains valid, call setup is allowed to continue without interruption. If the network address is not valid, however, the CMM may terminate the call setup routine and initiate a new call setup with a new network address. In this manner, some call connections may be set up faster relative to conventional call connection techniques.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
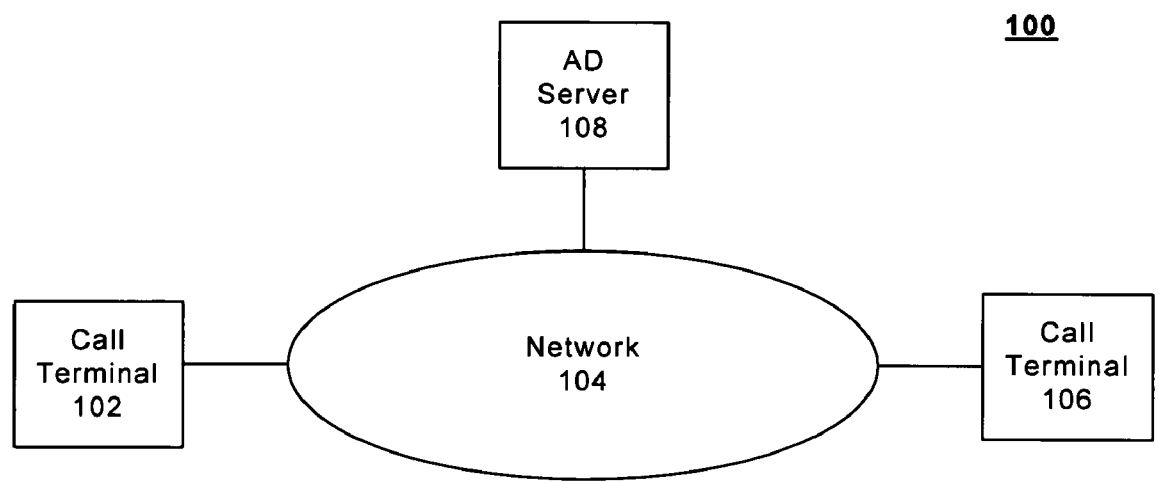
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a call terminal 102, a call terminal 106 and an Authoritative Directory (AD) server 108, all connected via network 104. A call terminal in this context may include any device capable of communicating audio signals over a network. A call terminal may comprise, for example, a packet telephony telephone, a computer equipped with a microphone and speaker, a wireless telephone, a personal digital assistant and so forth.

Network 104 may comprise, for example, a packet network. A packet network may comprise, for example, a number of network nodes connected by one or more communications media. A network node ("node") in this context may include any device capable of communicating information, such as a gateway, media gateway controller, gatekeeper, computer, server, switch, router, bridge and so forth. A communications medium may include any medium capable of carrying information signals, such as twisted-pair wire, co-axial cable, fiber optics, radio frequencies, electronic, acoustic or optical signals, and so forth.

In one embodiment of the invention, network 104 may operate in accordance with, for example, one or more Internet protocols such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org." Network 104 may also operate in accordance with one or more protocols to communicate VOP packets representing audio, voice or tone information. In one embodiment of the invention, for example, network 106 may operate in accordance with the International Telecommunications Union (ITU) Recommendation H.323 titled "Packet-based Multimedia Communication Systems," published in November 2000 and available from "www.itu.int" ("H.323 Specification"); and the IETF Proposed Standard RFC 2543 titled "SIP: Session Initiation Protocol," published in March 1999, and available from "www.ictf.org" ("SIP Specification). Although specific examples are discussed herein, it may be appreciated that the embodiments of the invention are not limited in this context. Further, network 104 may also include circuit-switched technologies and appropriate interfaces to packet network technologies.

In one embodiment of the invention, AD server 108 may comprise, for example, a Domain Name System (DNS) server. For example, a DNS server may receive a Uniform Resource Identifier (URI) and return a corresponding network address, such as an IP address. In one embodiment of the invention, AD server 108 may also be configured to translate a telephone number into a network address in accordance with one or more protocols. For example, AD server 108 may be configured to operate in accordance with the IETF Proposed Standard RFC 2916 titled "E.164 and DNS," published in September 2000, and available from "www.ietf.org" ("ENUM Specification"). The term "E. 164" as used herein may refer to a telephone number as defined by, for example, the International Telecommunications Union (ITU) Recommendation E.164 titled "The International Public Telephone Numbering Plan," published in May 1997.

In one embodiment of the invention, AD server 108 may operate in accordance with the ENUM Specification. AD server 108 may store Naming Authority Pointer (NAPTR) Domain Name System (DNS) resource records. A NAPTR record maps one or more network addresses to a special URI, referred to herein as an ENUM URI. Examples of network addresses may include a domain name, an electronic mail address, a telephone number, a facsimile number, a pager number, a mobile phone number, an IP address and any other custom or proprietary addresses, although the embodiments are not limited in this respect.

In one embodiment of the invention, an ENUM URI may be a translated telephone number, using the translation algorithm set forth in the ENUM Specification (referred to herein as the "ENUM Translation Algorithm"). For example, an ENUM URI may be derived using the following operations:

1. See that the E. 164 number is written in its full form, including the country code IDDD. Example: +46-8-9761234.
2. Remove all non-digit characters with the exception of the leading '+'. Example: +4689761234.
3. Remove all characters with the exception of the digits. Example: 4689761234
4. Put dots (".") between each digit. Example: 4.6.8.9.7.6.1.2.3.4
5. Reverse the order of the digits. Example: 4.3.2.1.6.7.9.8.6.4
6. Append the string ".e164.arpa" to the end. Example: 4.3.2.1.6.7.9.8.6.4. e 164.arpa AD server 108 may then use the ENUM URI to return a valid network address associated with the ENUM URI as stored in the NAPTR record. An example of a NAPTR record is shown in TABLE 1 below:

TABLE 1

| NAPTR Record |
| --- |
| 4.3.2.1.6.7.9.8.6.4.e164.arpa |
| name@intel.com |
| 1-813-123-4567 |
| 198.175.96.33 |

Figure 2:
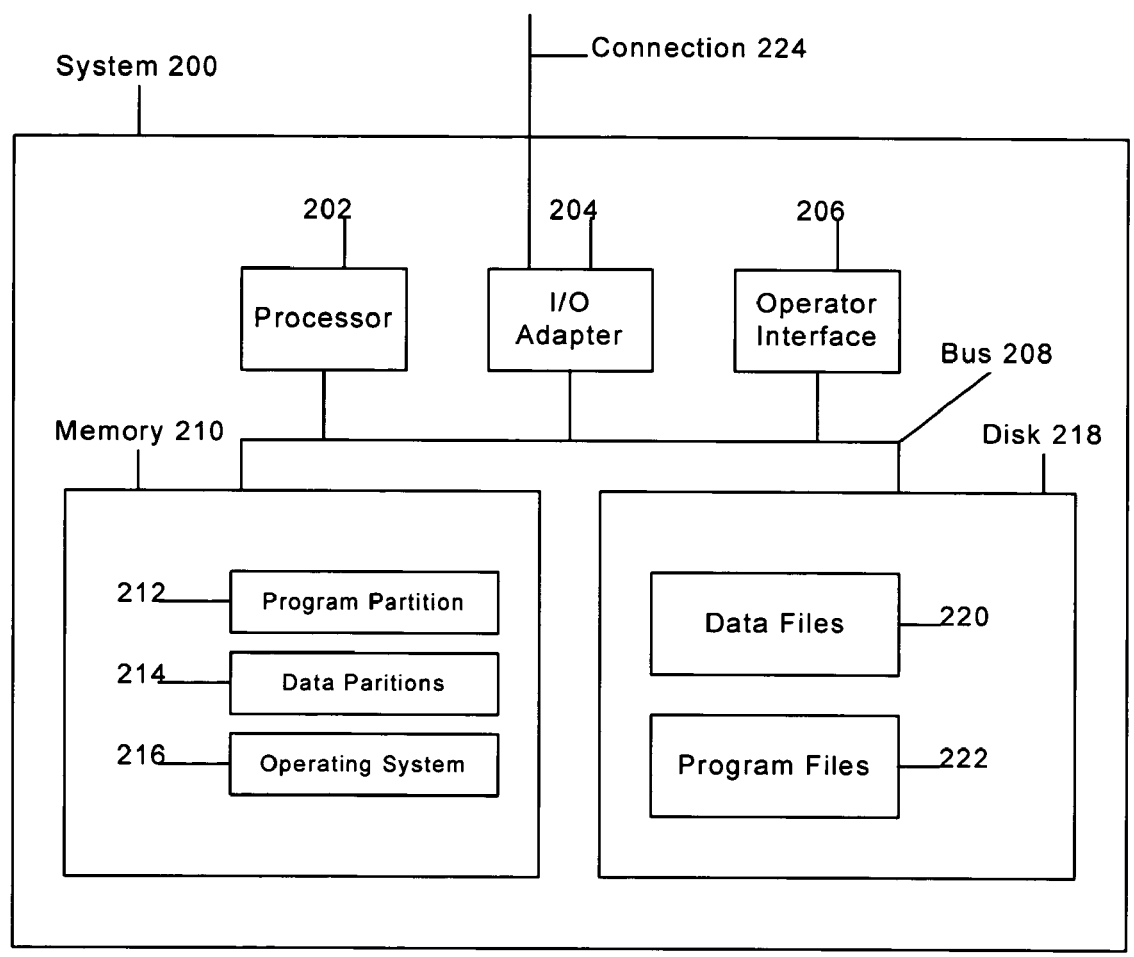
FIG. 2 is a block diagram of a processing system in accordance with one embodiment of the invention.

FIG. 2 illustrates a processing system in accordance with one embodiment of the invention. In one embodiment of the invention, a processing system 200 may represent a portion of a call terminal, such as call terminals 102 and 106. As shown in FIG. 2, system 200 may include a processor 202, an input/output (I/O) adapter 204, an operator interface 206, a memory 210 and disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA, assembly and so forth. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the network described in FIG. 1. Therefore, connection 224 represents a network or a direct connection to other equipment.

Processor 202 can be any type of processor capable of providing the speed and functionality required by the embodiments of the invention. For example, processor 202 could be a processor from a family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated. Processor 202 may further comprise a dedicated processor such as a network processor, embedded processor, micro-controller, controller and so forth.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (eg., floppy disk and hard drive), optical disk (eg., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, processing system 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. Program partition 212 may store and allow execution by processor 202 of program instructions that implement the functions of each respective system described herein. Data partition 214 may be accessible by processor 202 and stores data used during the execution of program instructions.

In one embodiment of the invention, program partition 212 may contain program instructions that will be collectively referred to herein as a Call Management Module (CMM). This module may manage setup of a call connection between two devices over a network, such as between call terminals 102 and 106 via network 104. Program partition 212 may also operate to store information in a cache, such as a network address or other routing information associated with a particular telephone number or ENUM URI. Of course, the scope of the invention is not limited to this particular set of instructions.

The operations of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
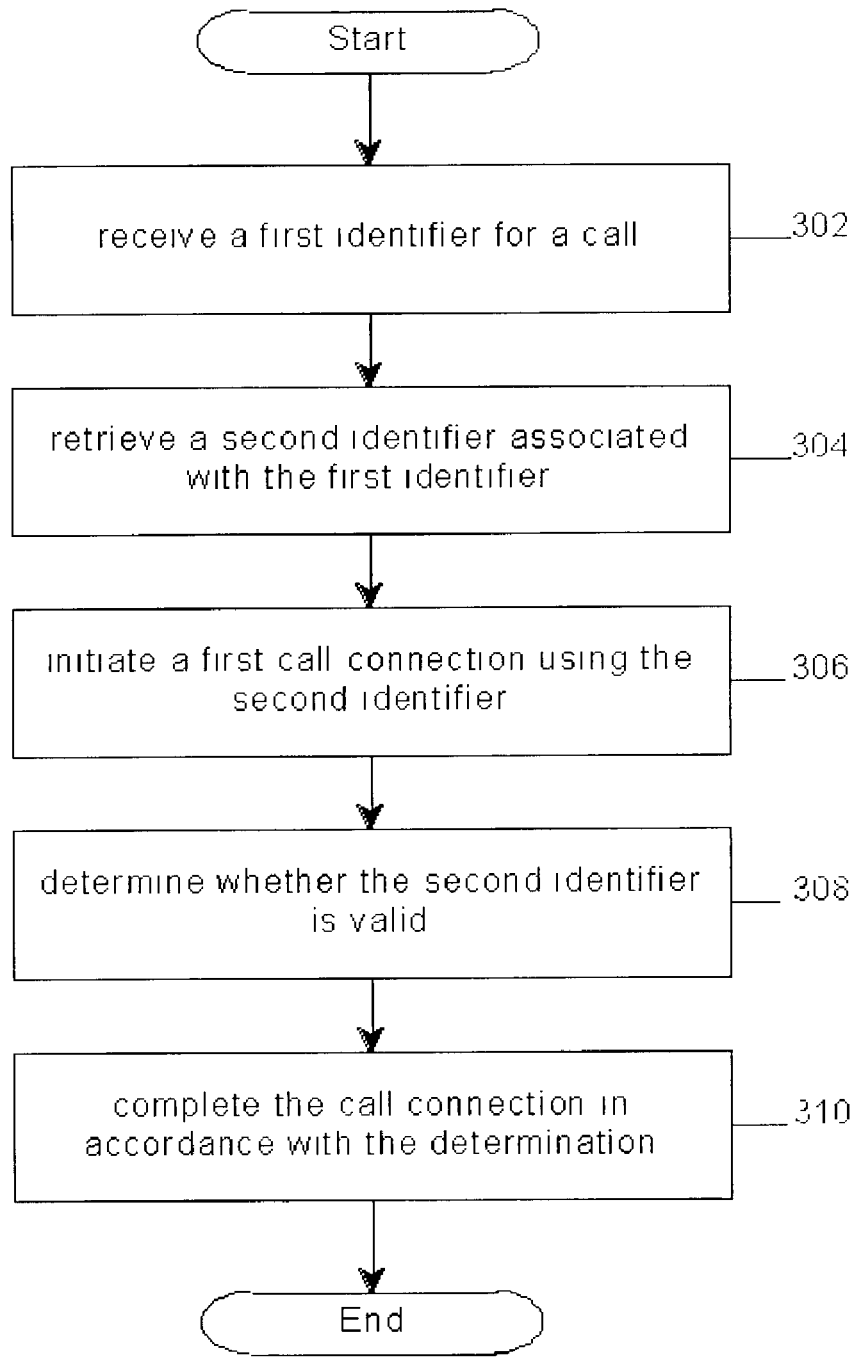
FIG. 3 is a block flow diagram of operations performed by a Call Management Module (CMM) in accordance with one embodiment of the invention.

FIG. 3 illustrates a block flow diagram of the operations performed by a CMM in accordance with one embodiment of the invention. In one embodiment of the invention, CMM and other modules may refer to the software and/or hardware used to implement the functionality for one or more embodiments as described herein. In one embodiment of the invention, these modules may be implemented as part of a processing system, such as processing system 200. It can be appreciated that this functionality, however, may be implemented by any device, or combination of devices, located anywhere in a communication network and still fall within the scope of the invention.

FIG. 3 illustrates a programming logic 300 for a CMM in accordance with one embodiment of the invention. Programming logic 300 may illustrate the operations to manage a call connection. A first identifier for a call may be received at block 302. A second identifier associated with the first identifier may be retrieved at block 304. A first call connection may be initiated using the second identifier at block 306. A determination may be made as to whether the second identifier is valid at block 308. A call connection may be completed at block 310 in accordance with the determination made at block 308.

In one embodiment of the invention, for example, the first identifier may comprise a telephone number or E. 164 number. The second identifier may comprise any information associated with the first identifier in a NAPTR record, such as a telephone number, a network address, an Internet Protocol (IP) address, an electronic mail address, a facsimile number, a pager number, and a mobile telephone number, for example.

In one embodiment of the invention, the determination at block 308 may be executed by sending a DNS request to a DNS server, such as AD server 108. The DNS server may send a third identifier in response to said request. The third identifier may be similar to the second identifier, except that it represents more current information since the NAPTR record is typically updated more frequently than the information stored in a local cache, e.g., at a call terminal. The CMM may compare the second and third identifiers to determine whether the second identifier remains a valid identifier. For example, if the second and third identifiers match then the second identifier may be valid. If the second and third identifiers do not match, however, then the second identifier is not valid and the first call connection may need to be terminated.

In one embodiment of the invention, the first identifier may be converted to a fourth identifier to speed up the validation process. An example of a fourth identifier may be an ENUM URI. For example, the CMM may implement the ENUM Translation Algorithm to convert an E.164 number to an ENUM URI. The call terminal may then send the ENUM URI to the DNS server for validation. In another embodiment of the invention, the first identifier may be sent directly to a DNS server, and the DNS server may implement the ENUM Translation Algorithm to translate the E. 164 number into an ENUM URI.

In one embodiment of the invention, a call connection may be completed at block 310 by determining that the second identifier is invalid. If the second identifier is invalid, the CMM may terminate the first call connection, and initiate a second call connection using the third identifier.

In one embodiment of the invention, the second identifier associated with the first identifier may be retrieved at block 304 from a cache located at the call terminal. The CMM may search the cache using the first identifier, and retrieve the second identifier associated with the first identifier from the cache. For example, the second identifier may be any identifier stored in a NAPTR record.

The operation of systems 100 and 200, and the processing logic shown in FIG. 3, may be better understood by way of example. Assume an operator of call terminal 102 wants to initiate a call to call terminal 106 via network 104. The operator may enter the E.164 number "1-813-123-4567" for call terminal 106 via the telephone keypad. The CMM search a cache for call terminal 102 for a second identifier associated with the E.164 number "1-813-123-4567", such as the IP address "198.175.96.32". The CMM may send a call connection request to VOP network 104 using the IP address "198.175.96.32".

At approximately the same time, the CMM of call terminal 102 may receive the E.164 number and convert the E.164 number to an ENUM URI, such as "7.6.5.4.3.2.1.3.1.8.1.e164.arpa". The CMM may send the ENUM URI to a DNS server, such as AD server 108, for validation. AD server 108 may receive the ENUM URI and retrieve the appropriate NAPTR record. AD server 108 may search the retrieved NAPTR record and find that the ENUM URI "7.6.5.4.3.2.1.3.1.8.1. e164.arpa" has an associated IP address of "198.175.96.33". AD server 108 may then send the IP address "198.175.96.33" to the CMM of call terminal 102.

The CMM may receive the IP address from AD server 108 and compare it to the IP address retrieved from its cache and used to initiate the call connection. In this example, the cache IP address of "198.175.96.32" fails to match the IP address received from AD server 108, that is, "198.175.96.33". At this point, the CMM may attempt to cancel the call connection started using the IP address "198.175.96.32" and start another call connection using the IP address "198.175.96.33". It can be appreciated that if the cache IP address had matched the IP address from AD server 108, the call connection process would be allowed to continue uninterrupted.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage a call connection, comprising:
receiving a first identifier for a call;
retrieving a second identifier associated with said first identifier;
initiating a first call connection using said second identifier from a call terminal;
determining whether said second identifier is valid by requesting, by said call terminal, a third identifier from an Authoritative Directory (AD) server and comparing said second and third identifiers;
converting said first identifier into a fourth identifier;
sending said fourth identifier to said AD server; and completing said call connection in accordance with said determination.

2. The method of claim 1, wherein said first identifier comprises an E.164 number.

3. The method of claim 1, wherein said second identifier comprises one of a telephone number, a network address, an Internet Protocol (IP) address, an electronic mail address, a facsimile number, a pager number, and a mobile telephone number.

4. The method of claim 1, further comprising determining that said second identifier is valid if said second and third identifiers match.

5. The method of claim 4, wherein said third identifier comprises one of a telephone number, a network address, an Internet Protocol (IP) address, an electronic mail address, a facsimile number, a pager number, and a mobile telephone number.

6. The method of claim 5, wherein said fourth identifier is an ENUM Uniform Resource Identifier (URI).

7. The method of claim 1, wherein said completing comprises:
determining that said second identifier is invalid;
terminating said first call connection; and
initiating a second call connection using the third identifier.

8. The method of claim 1, wherein said retrieving comprises:
searching a cache using said first identifier; and
retrieving said second identifier from said cache.

9. The method of claim 1, wherein said second identifier comprises an identifier from a Naming Authority Pointer (NAPTR) Domain Name System (DNS) resource record.

10. An article comprising:
a storage medium;
said storage medium including stored instructions that, when executed by a processor, result in managing a call connection by receiving a first identifier for a call, retrieving a second identifier associated with said first identifier, initiating a first call connection using said second identifier from a call terminal, determining whether said second identifier is valid by requesting, by said call terminal, a third identifier from an Authoritative Directory (AD) server and comparing said second and third identifiers, converting said first identifier into a fourth identifier, and sending said fourth identifier to said AD server, and completing said call connection in accordance with said determination.

11. The article of claim 10, wherein the stored instructions, when executed by a processor, further result in determining that said second identifier is valid if said second and third identifiers match.

12. The article of claim 10, wherein the stored instructions, when executed by a processor, further result in said completing by determining that said second identifier is invalid, terminating said first call connection, and initiating a second call connection using the third identifier.

13. The article of claim 10, wherein the stored instructions, when executed by a processor, further result in said retrieving by searching a cache using said first identifier, and retrieving said second identifier from said cache.

14. A system, comprising:
a computing platform adapted to manage a call connection;
said platform being further adapted to receiving a first identifier for a call, retrieving a second identifier associated with said first identifier, initiating a first call connection using said second identifier from a call terminal, determining whether said second identifier is valid by requesting, by said call terminal, a third identifier from an Authoritative Directory (AD) server and comparing said second and third identifiers, converting said first identifier into a fourth identifier, and sending said fourth identifier to said AD server, and completing said call connection in accordance with said determination.

15. The system of claim 14, wherein said platform is further adapted to determine that said second identifier is valid if said second and third identifiers match.

16. The system of claim 14, wherein said platform is further adapted to perform said completing by determining that said second identifier is invalid, terminating said first call connection, and initiating a second call connection using the third identifier.

17. The system of claim 14, wherein said platform is further adapted to perform said retrieving by searching a cache using said first identifier, and retrieving said second identifier from said cache.

18. A system to manage a call connection, comprising:
a call terminal to receive an E.164 number;
a Call Management Module (CMM) to retrieve an identifier associated with said E.164 number, initiate a first call connection using said identifier, convert the identifier, and send a request to validate said identifier;
an AD server to receive said request to validate said identifier, said AD server to compare said identifier with another identifier and send a message to said CMM to indicate whether said identifier is valid, with said CMM terminating said first call connection if said identifier is invalid.

19. The system of claim 18, wherein said CMM initiates a second call connection if said identifier is invalid.

20. The system of claim 18, wherein said CMM converts said identifier to an ENUM URI prior to validation by said AD server.

* * * * *

UNITED STATES PATENT AND TRADEMARK OFFICE
CERTIFICATE OF CORRECTION

PATENT NO.        : 7,161,933 B2                                     Page 1 of 1
APPLICATION NO. : 10/254484
DATED             : January 9, 2007
INVENTOR(S)       : Stanford It is certified that error appears in the above-identified patent and that said Letters Patent is hereby corrected as shown below:

In column 7, line 20, in Claim 7, delete "mcthod" and insert -- method --, therefor.

In column 7, line 24, in Claim 7, delete "thc" and insert -- the --, therefor.

In column 8, line 38, in Claim 18, delete "E.1 64" and insert -- E.164 --, therefor.

In column 8, line 49, in Claim 20, delete "convcrts" and insert -- converts --, therefor.

Signed and Sealed this

Sixteenth Day of October, 2007

JON W. DUDAS
*Director of the United States Patent and Trademark Office*